(12) United States Patent
Kisch et al.

(10) Patent No.: US 10,513,101 B2
(45) Date of Patent: Dec. 24, 2019

(54) APPARATUSES AND METHODS FOR CREATING LAYERED TAPE COMPOSITE STRUCTURES

(71) Applicant: The Boeing Company, Chicago, IL (US)

(72) Inventors: Robert Arthur Kisch, Auburn, WA (US); Peter D. McCowin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 455 days.

(21) Appl. No.: 14/657,816

(22) Filed: Mar. 13, 2015

(65) Prior Publication Data
US 2016/0263877 A1    Sep. 15, 2016

(51) Int. Cl.
B32B 37/14    (2006.01)
B29C 70/54    (2006.01)
(Continued)

(52) U.S. Cl.
CPC ............. B32B 37/14 (2013.01); B29C 70/38 (2013.01); B29C 70/54 (2013.01);
(Continued)

(58) Field of Classification Search
CPC .. B32B 37/14; B32B 5/00; B32B 5/12; B32B 2309/105; B32B 5/28; B32B 37/0046; B32B 38/0004; B32B 3/04; B32B 3/08; B32B 5/028; B64C 1/12; B64C 1/064; B64C 1/065; B64C 3/182; B64C 3/185;
(Continued)

(56) References Cited

U.S. PATENT DOCUMENTS 4,331,723 A    5/1982  Hamm
4,699,683 A   10/1987  McCowin
(Continued)

FOREIGN PATENT DOCUMENTS

EP    2 610 166        7/2013
WO    WO 01/62495      8/2001

OTHER PUBLICATIONS

European Patent Office, Extended European Search Report for related European Patent Application No. 16159810, dated Aug. 19, 2016.
(Continued)

*Primary Examiner* — Brian Handville
(74) *Attorney, Agent, or Firm* — Dascenzo Intellectual Property Law, P.C.

(57) ABSTRACT

Apparatuses for creating layered tape composite structures include a frame, a source of first tape, and a first tape placement module configured to receive first tape and place the first tape on a layup surface as the frame translates along the layup surface. Some apparatuses further include a source of second tape, and a second tape placement module configured to receive second tape and place the second tape on the first tape as the frame moves along the layup surface. Methods for creating layered tape composite structures include supplying a first tape, and placing the first tape on a layup surface. Some methods further include supplying a second tape, and placing the second tape on the first tape on the layup surface.

24 Claims, 6 Drawing Sheets

(51) Int. Cl.
*B29D 99/00* (2010.01)
*B32B 3/04* (2006.01)
*B32B 5/00* (2006.01)
*B32B 5/02* (2006.01)
*B32B 5/12* (2006.01)
*B32B 5/26* (2006.01)
*B32B 7/02* (2019.01)
*B64C 1/06* (2006.01)
*B29C 70/38* (2006.01)
*B64C 3/18* (2006.01)
*B64C 3/20* (2006.01)

(52) U.S. Cl.
CPC ............ *B29D 99/0003* (2013.01); *B32B 3/04* (2013.01); *B32B 5/00* (2013.01); *B32B 5/02* (2013.01); *B32B 5/024* (2013.01); *B32B 5/12* (2013.01); *B32B 5/26* (2013.01); *B32B 7/02* (2013.01); *B64C 1/064* (2013.01); *B64C 1/065* (2013.01); *B32B 2250/05* (2013.01); *B32B 2250/44* (2013.01); *B32B 2260/021* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/732* (2013.01); *B32B 2309/105* (2013.01); *B32B 2605/18* (2013.01); *B64C 3/182* (2013.01); *B64C 3/185* (2013.01); *B64C 3/20* (2013.01); *Y02T 50/43* (2013.01)

(58) Field of Classification Search
CPC ............ B29D 99/0003; B29D 99/0014; B29D 99/0007; B29D 99/0021; B29D 99/0025; B29D 99/0053; Y02T 50/433; B29C 70/38; B29C 70/54; B29C 70/865; B29C 70/52; B29C 70/342; B29C 70/545; B29C 2793/00; B29C 70/083; B29C 70/086; B29C 70/28; B29C 70/30; B29C 70/384; B29C 70/443; B29C 70/526; B29C 70/58; Y10T 428/24174; Y10T 428/241; Y10T 156/17; Y10T 428/197; Y10T 428/24182; Y10T 156/1023; Y10T 156/1031; Y10T 156/1084; Y10T 156/1317; Y10T 156/133; Y10T 156/1343; Y10T 156/1348; Y10T 156/14; Y10T 156/1788; Y10T 156/1795; Y10T 403/7047; Y10T 428/13424

See application file for complete search history.

(56) References Cited

U.S. PATENT DOCUMENTS

| | | |
|---|---|---|
| 4,789,594 A | 12/1988 | Stawski |
| 5,639,535 A | 6/1997 | McCarville |
| 6,231,941 B1 | 5/2001 | Cundiff et al. |
| 6,562,436 B2 | 5/2003 | George et al. |
| 6,689,448 B2 | 2/2004 | George et al. |
| 6,709,538 B2 | 3/2004 | George et al. |
| 8,540,833 B2 | 9/2013 | Deobald et al. |
| 8,591,685 B2 | 11/2013 | Anderson et al. |
| 2010/0224716 A1* | 9/2010 | McCowin ............ B29C 70/384 242/423.1 |
| 2013/0105072 A1* | 5/2013 | Anderson ............ B29C 70/52 156/264 |
| 2013/0171895 A1 | 7/2013 | Wolf et al. |
| 2014/0034236 A1 | 2/2014 | Guzman et al. |

OTHER PUBLICATIONS

U.S. Appl. No. 14/244,690, filed Apr. 3, 2014, McCarville et al.
U.S. Appl. No. 14/464,467, filed Aug. 20, 2014, Klein et al.

* cited by examiner

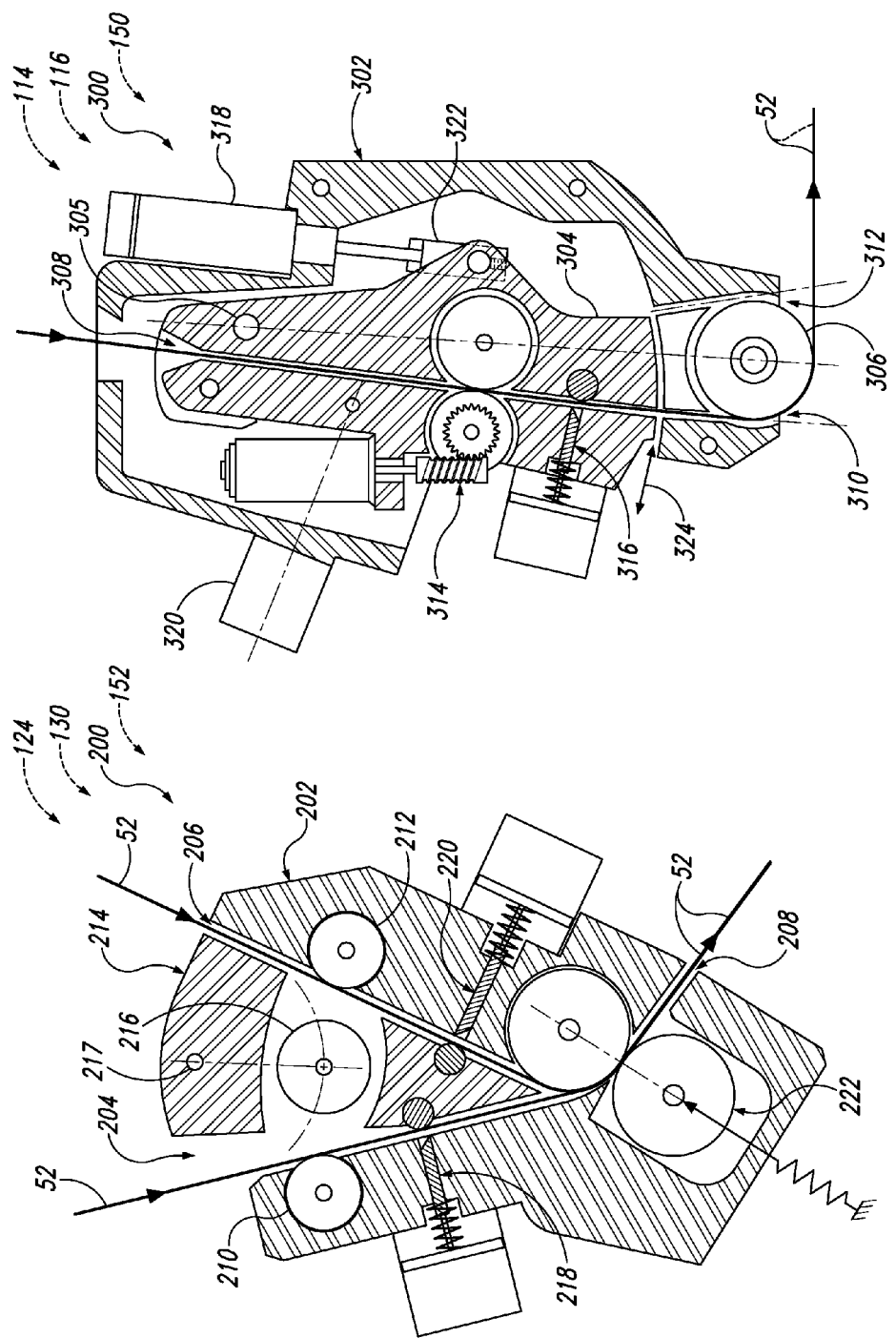

APPARATUSES AND METHODS FOR CREATING LAYERED TAPE COMPOSITE STRUCTURES

FIELD

The present disclosure relates to layered tape composite structures.

BACKGROUND

Composite structures often include laminate assemblies in which sheets or tapes (often referred to as plies or ply layers) of a composite material, such as a pre-impregnated (or prepreg) material, may be layered, or otherwise assembled on a support surface, to define a specific composite structure. In some composite structures, plies of composite material may be bent, wrapped, formed, or otherwise extended between a first plane, or surface, and a second plane, or surface. In such examples, the finite thickness and/or mechanical stiffness of the sheets of composite material result in a finite bend, or radius of curvature, in a transition region between the first surface and the second surface. In some geometries, this finite radius of curvature results in a void volume, or cavity, between adjacent outer surfaces of co-assembled plies. To avoid a mechanical loading discontinuity, this void volume may be filled with, or otherwise occupied by, a filler material, such as a radius filler, which also may referred to as a noodle. The manufacture of layered composite structures, including radius fillers, is time consuming, labor intensive, and often results in damage during handling. Accordingly, there is a need to automate the construction of layered composite structures.

SUMMARY

Apparatuses and methods for creating layered tape composite structures are disclosed herein.

Some apparatuses include a frame configured to be translated relative to a layup surface; a source of first tape supported by the frame; and a first tape placement module supported by the frame and configured to receive first tape from the source of first tape and place the first tape on the layup surface as the frame translates along the layup surface in a first direction. Some such apparatuses further includes a source of second tape supported by the frame; and a second tape placement module supported by the frame relative to the first tape placement module and configured to receive second tape from the source of second tape and place the second tape on the first tape placed on the layup surface as the frame moves along the layup surface in the first direction.

Some methods include supplying a first tape; and placing the first tape on a layup surface. Some such methods further include supplying a second tape; and placing the second tape on the first tape on the layup surface.

Some methods include supplying one or more first tapes; supplying one or more second tapes; placing the one or more first tapes on a layup surface; placing the one or more second tape on the one or more first tapes on the layup surface; and actively controlling one of (i) a number of first tapes being supplied and placed to control a thickness of the first tapes being placed, and (ii) a number of second tapes being supplied and placed to control a thickness of the second tapes being placed.

Some methods include supplying two or more tapes, wherein the two or more tapes have the same width; combining the two or more tapes to form a combined tape; and placing the combined tape on a layup surface.

BRIEF DESCRIPTION OF THE DRAWINGS

FIG. 7 is a schematic illustration representing an example tape combining module of an apparatus for creating layered tape composite structures.

FIG. 8 is a schematic illustration representing an example tape placement module of an apparatus for creating layered tape composite structures.

DESCRIPTION

Apparatuses and methods for creating layered composite structures, as well as layered tape composite structures and apparatuses that include layered tape composite structures, are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
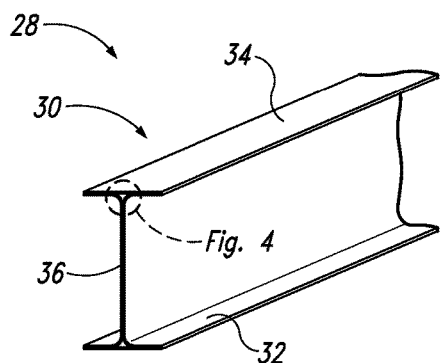
FIG. 1 is a fragmentary schematic representation of example composite structures that may include layered tape radius fillers created by apparatuses and/or methods according to the present disclosure.

An example structural component 28 constructed of a composite structure 30 is provided in FIG. 1 for illustrative purposes in the form of an I-beam having opposing flanges 32, 34, and a web 36 extending between the opposing flanges. With reference now to the detailed view of FIG. 2, it can be seen that the flange 34 is constructed of an upper layer 39 that spans the flange 34, and two lower layers 40, 42 that transition from the flange 34 to also collectively define the web 36. A void space 38 may be filled with, or otherwise occupied by, a radius filler 29, which may extend therein and which may be a layered tape radius filler 50 according to the present disclosure. While discussed in the context of aircraft 20, composite structures 30 including layered tape radius fillers 50, as well as other types of layered tape composite structures 49, may define and/or be utilized to construct any suitable assembly, device, apparatus, etc., illustrative, non-exclusive examples of which include land vehicles, marine vehicles, bridges, masts, and any other structure constructed of composite structures requiring or benefiting from radius fillers, all of which are considered to be within the scope of the present disclosure.

Radius fillers may be constructed, or created, using a variety of processes, examples of which are disclosed in U.S. Patent Application Publication No. 2014/0034236, U.S. patent application Ser. No. 14/244,690, and U.S. patent application Ser. No. 14/464,467, the disclosures of which are incorporated herein by reference. The present disclosure relates to layered tape composite structures, that is, composite structures that are created by stacking, or layering, a plurality of individual lengths, or ribbons, of tape. Layered tape radius fillers 50 are an illustrative, non-exclusive example of layered tape composite structures 49, and the present disclosure is not limited to apparatuses and methods for forming layered tape radius fillers.

Figure 3:
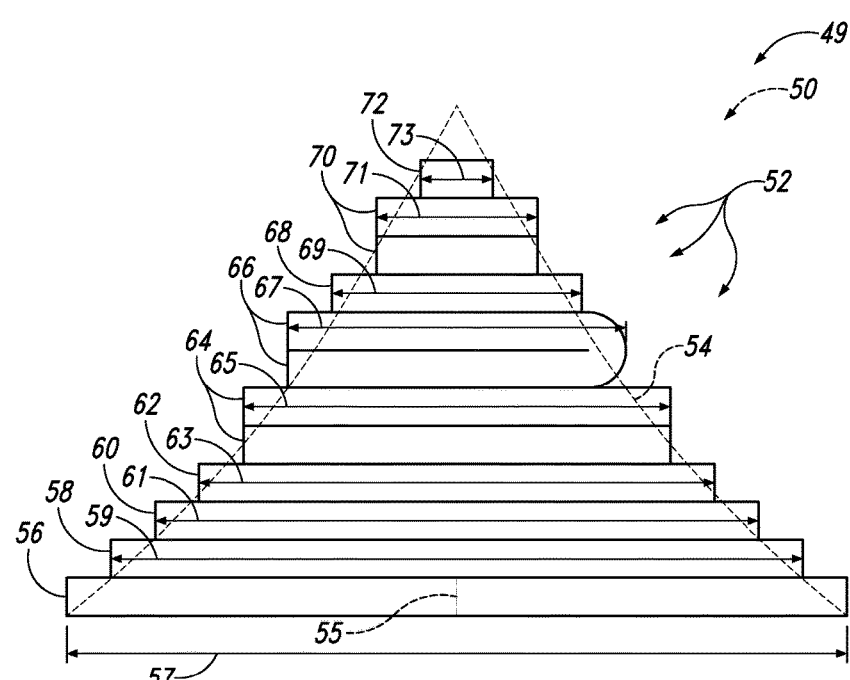
FIG. 3 is a schematic profile view representing example layered tape composite structures created by apparatuses and/or methods according to the present disclosure.

FIG. 3 schematically represents layered tape composite structures 49, which optionally may form layered tape radius fillers 50, that may be created by apparatuses and/or methods according to the present disclosure. As schematically illustrated, a layered tape composite structure 49 may include a plurality of tapes, or ribbons, 52 having different widths. One or more layers of tape 52 having the same width may be included in a layered tape composite structure 49. Additionally or alternatively, one or more layers of tape 52 having the same width may be directly layered on top of each other with their respective edges being aligned with each other, or at least approximately or substantially aligned with each other. Additionally or alternatively, two or more tapes 52 may be positioned laterally adjacent each other to define a single layer of the layered tape composite structure 49, that is with respective edges of the two or more tapes abutting each other, as optionally and schematically presented in FIG. 3 at 55 with respect to the lower most layer of tape.

Figure 2:
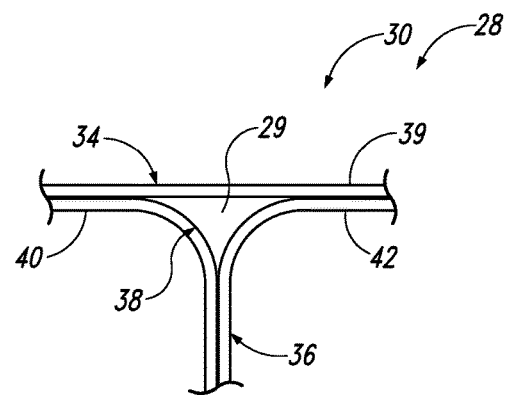
FIG. 2 is a fragmentary end view of a composite structure of FIG. 1, illustrating an illustrative, non-exclusive example of a radius filler location.

Accordingly, a predetermined configuration of layers of tapes 52 may be operatively layered together to generally define or correspond to a desired cross-sectional profile 54 of a layered tape composite structure 49 being created, as schematically represented in FIG. 3 with a dashed line, for example with the desired cross-sectional profile 54 corresponding to, or generally corresponding to, a void 38 of a composite structure 30 as schematically illustrated in FIG. 2 and discussed herein in the example of layered tape radius fillers 50. A desired cross-sectional profile 54 additionally or alternatively may be described as a theoretical cross-sectional profile 54, a predetermined desired cross-sectional profile 54, and/or a predefined desired cross-sectional profile 54. In some examples, such as in the example of layered tape radius fillers 50, a desired cross-sectional profile 54 may be generally triangular, or generally triangular with two or more arcuate sides and/or two or more flat sides.

Herein and to facilitate discussion and distinction between tapes of different widths, tapes 52 having a common width may be described and grouped together as a first tape, a second tape, a third tape, and so on. For example, in the illustrative, non-exclusive and schematic example of FIG. 3, provided solely for illustrative purposes only, the schematically illustrated layered tape composite structure 49 may be described as including a first layer 56 having a first width 57, a second layer 58 positioned directly above the first layer 56 and having a second width 59 that is less than the first width 57, a third layer 60 positioned directly above the second layer 58 and having a third width 61 that is less than the second width 59, a fourth layer 62 positioned directly above the third layer 60 and having a fourth width 63 that is less than the third width 61, two fifth layers 64 positioned directly above the fourth layer 62 and having a fifth width 65 that is less than the fourth width 63, two sixth layers 66 positioned directly above the fifth layers 64 and having a sixth width 67 that is less than the fifth width 65, a seventh layer 68 positioned directly above the sixth layers 66 and having a seventh width 69 that is less than the sixth width 67, two eighth layers 70 positioned directly above the seventh layer 68 and having an eighth width 71 that is less than the seventh width 69, and a ninth layer 72 positioned directly above the eighth layer 70 and having a ninth width 73 that is less than the eighth width 71. In the schematically represented example of FIG. 3, each tape 52 is shown with the same thickness; however, it is within the scope of layered composite structures 49, and thus of apparatuses and methods according to the present disclosure, that tapes of various thicknesses, as well as various widths, may be utilized.

In some examples, such as illustrated in connection with sixth layers 66, two or more layers optionally may be formed by folding a single tape against itself.

As mentioned, each type of tape (i.e., first tape, second tape, third tape, and so forth) defines a common width, regardless of whether the tape is supplied from a single source or is supplied from two or more sources. Accordingly, when referring to two or more layers of first tape, all of the layers of first tape have the same width. In some examples, the two or more layers of first tape are identical in construction, including not only the same width, but also the same thickness and the same material from which the layers are constructed. In other examples, while having the same width, two or more layers of first tape may have different thicknesses, may be constructed from different materials, or may have different material properties. For example, when tape is constructed of fiber reinforced composite material, the two or more layers of first tape may have the same width, optionally differing in one or more of thickness, fiber material, fiber angle, and binder material.

Additionally, each distinct width of tape (e.g., with reference to FIG. 3, a first tape 56 in contrast to a second tape 58) may differ from each other only in width, that is, have the same thickness and be constructed of the same material or have the same material properties. Alternatively, a first tape may differ from a second tape in one or more of width, thickness, fiber material, fiber angle, and binder material.

Fiber reinforced composite materials additionally or alternatively may be described as or referred to as fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, glass fibers, and/or other fibers. In some embodiments, the fibers may be woven into a fabric. In some examples, tapes 52 may be prepreg tapes, that is, a layer of fibers that are pre-impregnated with the associated binding material. The binding material of prepreg tapes may be partially cured, or pre-cured, so as to permit operative handling of the tapes and selective assembly of multiple layers of tapes together. Typically, partially cured prepreg tapes are tacky to the touch and therefore easily stick together when layered, but not necessarily in a permanent fashion. That is, when layered, two adjacent tapes may be permitted to be separated, if so desired. To more permanently affix adjacent layers of tapes together, the layered tapes may be compacted, or compressed, together. This compression of two more layers is referred to as compaction, or as compacting, of the layers.

Generally, tapes 41 should be understood to be lengths of thin sheet-like, or film, material having a constant width, a constant thickness, and a length that is significantly longer than the width and the thickness. Illustrative, non-exclusive examples of widths of tapes 52 that may be suitable for constructing layered composite structures 49, including layered tape radius fillers 50, include (but are not limited to) widths of in the range of ⅛-2 inches or greater and/or in the range of 5-50 millimeters (mm) or greater, including widths of ⅛ inch, ¼ inch, ½ inch, ¾ inch, 1 inch, 1.5 inch, 2 inches, 5 mm, 10 mm, 20 mm, 30 mm, 40 mm, and 50 mm.

Figure 4:
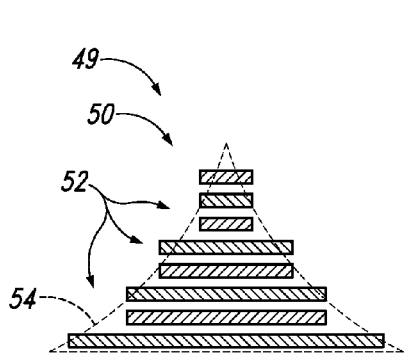
FIG. 4 is another schematic profile view representing example layered tape composite structures created by apparatuses and/or methods according to the present disclosure.
Figure 5:
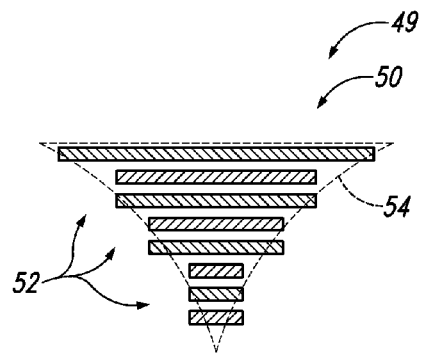
FIG. 5 is another schematic profile view representing example layered tape composite structures created by apparatuses and/or methods according to the present disclosure.

Turning now to FIGS. 4 and 5, and as discussed in greater detail herein, layered tape radius fillers 50 may be constructed ex situ, that is, on a layup surface that is separate and apart from the ultimate composite structure of which the radius filler will become a part, or in situ, that is, directly within the composite structure of which the radius filler becomes a part. Accordingly, in the example of an ex situ construction and with reference to FIG. 4, a layered tape radius filler 50 may be constructed with its widest layer or layers laid down first and with layers of decreasing width subsequently laid down. In contrast, in the example of an in situ construction and with reference to FIG. 5, a layered tape radius filler 50 may be constructed with its narrowest layer or layers laid down first directly in a void space 38 and with layers of increasing width subsequently laid down to fill the remainder of the void space.

Figure 6:
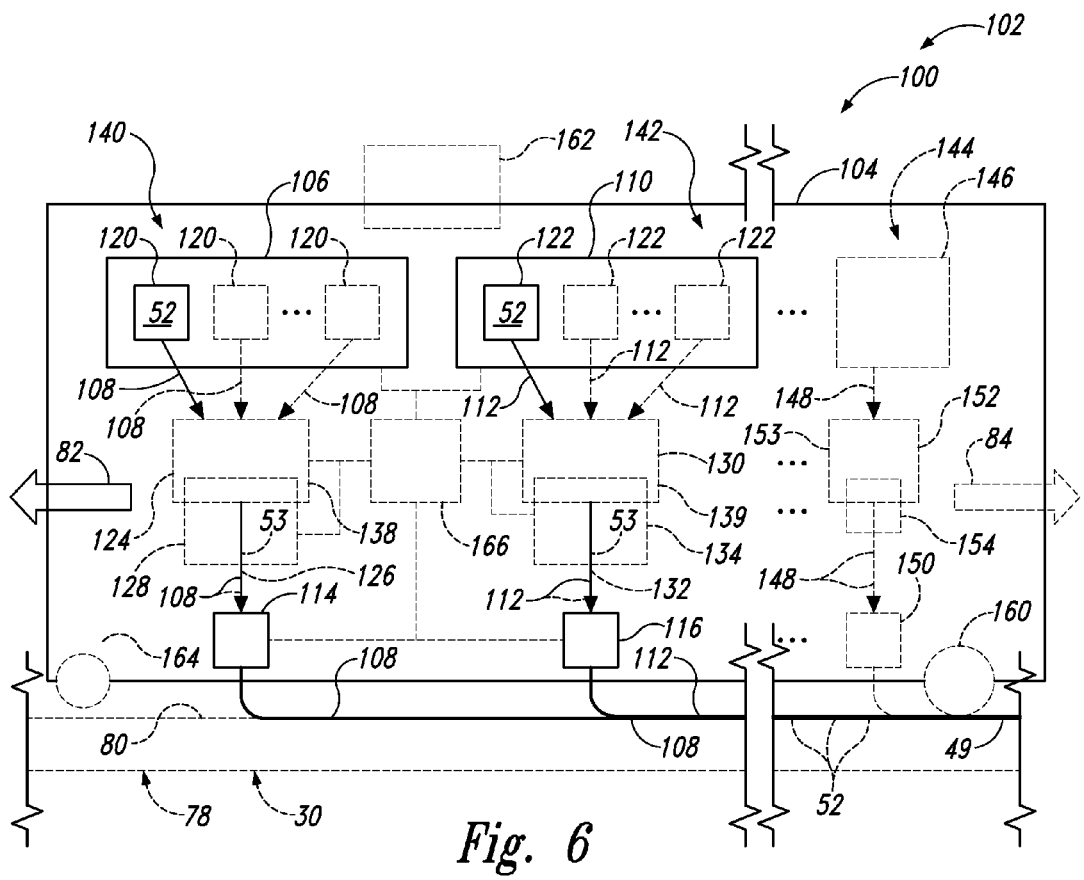
FIG. 6 is a schematic diagram representing apparatuses for creating layered tape composite structures.

Turning now to FIG. 6, a representation of illustrative, non-exclusive examples of apparatuses 100 for creating layered tape composite structures 49 is schematically provided. FIG. 6 additionally or alternatively may be described as schematically representing, or illustrating, the flow of tapes 52 through an apparatus 100 to result in a layered tape composite structure 49, or as representing, or illustrating, a system 102 for creating layered tape composite structures 49.

As schematically illustrated in solid lines in FIG. 6, an apparatus 100 generally includes a frame, or support structure, 104 that is configured to be translated relative to a layup surface 80. An apparatus 100 also generally includes a source 106 of first tape 108 supported by the frame. An apparatus 100 also generally includes a source 110 of second tape 112 supported by the frame. That said, it is within the scope of the present disclosure that an apparatus 100 may include only a source 106 of first tape 108 without also include a source 110 of second tape 112. An apparatus 100 also generally includes a first tape placement module 114 supported by the frame. In embodiments that include a source 110 of second tape 112, an apparatus 100 also generally includes a second tape placement module 116 supported by the frame. As schematically illustrated, the first tape placement module 114 is configured to receive first tape 108 from the source 106 of first tape 108 and place the first tape on a layup surface 80 as the frame 104 is caused to translate along the layup surface in a first direction 82, as represented by the large left arrow at 82 in FIG. 6. The second tape placement module 116, when present, is supported by the frame 104 relative to the first tape placement module 114 and is configured to receive second tape 112 from the source 110 of second tape 112 and place the second tape 112 on the first tape 108 that was placed on the layup surface 80 as the frame 104 is caused to move along the layup surface in the first direction 82.

The frame 104 may have any suitable construction such that it is configured to support the various other components of the apparatus 100 relative to each other for operatively creating a layered tape composite structure 49. A frame 104 additionally or alternatively may be described as a housing 104, a body 104, or a structural frame 104.

As schematically and optionally illustrated in FIG. 6, the source 106 of first tape 108 may include two or more supplies 120 of first tape 108. Each of the optional first tapes 108 from the two or more supplies 120 may be identical in construction, that is, with the same width, the same thickness, and the same material construction. Alternatively, the first tapes 108 from the two or more supplies 120 may be identical in width but differ in thickness or material construction. Similarly, the source 110 of second tape 112 may include two or more supplies 122 of second tape 112. Each of the optional second tapes 112 from the two or more supplies 122 may be identical in construction or may be identical in width but may differ in thickness or material construction.

In apparatuses 100 that include two or more supplies 120 of first tape 108, an apparatus 100 may further include a first tape combining module 124. When present, the first tape combining module 124 is supported by the frame 104 and is configured to receive the first tapes 108 from the supplies 120 and to operatively couple, or layer, them together to form a combined first tape 126 prior to receipt by the first tape placement module 114, as schematically and optionally illustrated in FIG. 6. In some such examples, the first tape combining module 124 also is configured to compact the combined first tape 126 prior to receipt by the first tape placement module 114. Additionally or alternatively, an apparatus 100 may further include a first tape compactor module 128 that is supported by the frame 104 and that is configured to receive the combined first tape 126 from the first tape combining module 124 and to compact the combined first tape 126 prior to receipt by the first tape placement module 114. In FIG. 6, the optional first tape compactor module 128 is illustrated in an overlapping relationship with the optional first tape combining module 124, schematically representing that one or both such modules may compact two or more first tapes 108 together as combined first tape 126.

Similarly, in apparatuses 100 that include two or more supplies 122 of second tape 112, an apparatus 100 may further include a second tape combining module 130. When present, the second tape combining module 130 is supported by the frame 104 and is configured to receive second tapes 112 from the supplies 122 and to operatively couple, or layer, them together to form a combined second tape 132 prior to receipt by the second tape placement module 116, as schematically and optionally illustrated in FIG. 6. In some such examples, the second tape combining module 130 also is configured to compact the combined second tape 132 prior to receipt by the second tape placement module 116. Additionally or alternatively, an apparatus 100 may further include a second tape compactor module 134 that is supported by the frame 104 and that is configured to receive the combined second tape 132 from the second tape combining module 130 and to compact the combined second tape 132 prior to receipt by the second tape placement module 116. In FIG. 6, the optional second tape compactor module 134 is illustrated in an overlapping relationship with the optional second tape combining module 130, schematically representing that one or both such modules may compact two or more second tapes 112 together as combined second tape 132.

An apparatus 100 optionally may include one or more first tape folding modules 138 that are supported by the frame 104. When present, a first tape folding module 138 is configured to receive a first tape 108 from a supply 120 and to operatively fold the tape 108 longitudinally against itself to form a folded tape 53, which optionally may be described as a combined first tape 126. In some examples, the fold (not shown) may be at or approximately at the midline (not shown) of the tape's width (not shown) to generally form two layers (not shown) of equal width (not shown), approximately half that of the tape's overall width (see, e.g., layers 66 in FIG. 3). In other examples, the tape 108 may be folded longitudinally at a position (not shown) other than the midline (not shown) of the tape 108. Additionally or alternatively, the tape 108 may be folded longitudinally at two or more positions (not shown), such as to fold the tape 108 in thirds, fourths, and so on, or to otherwise fold the tape 108 in a predetermined and desired configuration. In some examples, the first tape folding module 138 also is configured to compact the first tape 108 as it is being folded and/or after being folded by the first tape folding module 138. Additionally or alternatively, a first tape compactor module 128 may receive the folded first tape 108 from the first tape folding module 138 and compact the folded first tape 108 prior to receipt by the first tape placement module 114. Additionally or alternatively, a first tape folding module 138 may be upstream from a first tape combining module 124, and a first tape combining module 124 may combine a folded first tape 108 with additional layers of first tape 108, whether folded or not.

Similarly, in apparatuses 100 that include a supply 122 of second tape, an apparatus 100 optionally may include one or more second tape folding modules 139 that are supported by the frame 104. When present, a second tape folding module 139 is configured to receive a second tape 112 from a supply 122 and to operatively fold the tape 112 longitudinally against itself to form a folded tape 53, which may be described as a combined second tape 132. In some examples, the fold (not shown) may be at or approximately at the midline (not shown) of the tape's width (not shown) to generally form two layers (not shown) of equal width, approximately half that of the tape's overall width (not shown (see, e.g., layers 66 in FIG. 3). In other examples, the tape 112 may be folded longitudinally at a position (not shown) other than the midline (not shown) of the tape 112. Additionally or alternatively, the tape 112 may be folded longitudinally at two or more positions (not shown), such as to fold the tape 112 in thirds, fourths, and so on, or to otherwise fold the tape 112 in a predetermined and desired configuration. In some examples, the second tape folding module 139 also is configured to compact the second tape 112 as it is being folded and/or after being folded by the second tape folding module 139. Additionally or alternatively, a second tape compactor module 134 may receive the folded second tape 112 from the second tape folding module 139 and compact the folded second tape 112 prior to receipt by the second tape placement module 116. Additionally or alternatively, a second tape folding module 139 may be upstream from a second tape combining module 130, and a second tape combining module may combine a folded second tape 112 with additional layers of second tape 112, whether folded or not.

The combination of the source 106 of first tape 108 and the first tape placement module 114, optionally together with one or more of the optional first tape combining module 124, the optional first tape compactor module 128, and the optional first tape folding module 138, collectively may be described as a first tape sub-assembly 140 that is supported by the frame 104. Similarly, the combination of the source 110 of second tape 112 and the second tape placement module 116, optionally together with one or more of the optional second tape combing module 130, the optional second tape compactor module 134, and the optional second tape folding module 139, collectively may be described as a second tape sub-assembly 142. As schematically illustrated in FIG. 6, an apparatus 100 may include any number of sub-assemblies supported by the frame 104, as represented by the ellipses and an Nth sub-assembly 144. That is, Nth sub-assembly 144 schematically represents that an apparatus 100 may include one or more additional sources 146 of tape 148 and one or more additional placement modules 150 respectively corresponding to the one or more additional sources 146, as well as optionally one or more additional tape combining modules 152, optionally one or more additional tape folding modules 153, and optionally one or more additional compactor modules 154 respectively corresponding to the one or more additional sources 146.

As schematically and optionally illustrated in FIG. 6, some apparatus 100 also may include a composite structure compactor 160 that is supported by the frame 104 relative to the second tape placement module 116 opposite the first tape placement module 114. When present, the composite structure compactor 160 is configured to compact the first tape 108 and the second tape 112, and optionally additional Nth tapes 148, on the layup surface 80 as the frame 104 translates along the layup surface 80 in the first direction 82. Accordingly, the optional composite structure compactor 160 operatively compacts together the tapes 52 that have been operatively placed by the respective placement modules on and/or relative to the layup surface.

As also schematically and optionally illustrated in FIG. 6, some apparatuses 100 also may include a drive assembly 162 that is operatively coupled to the frame 104 and configured to operatively and selectively translate the frame 104 relative to the layup surface 80 in at least the first direction 82. Additionally or alternatively, the layup surface 80 may be operatively configured to be translated relative to the frame 104 in a direction 84 opposite the first direction 82. In some examples, the drive assembly 162 may include or be a robotic arm, for example. Additionally or alternatively, an apparatus may be provided without a drive assembly 162 but may be configured to be operatively coupled to a drive assembly 162, such as with an apparatus 100 defining an end effector for a robotic arm. Examples of drive assemblies 162 other than robotic arms also are within the scope of the present disclosure, including drive assemblies that are supported relative to a layup surface 80 for reciprocal, or other, translation back and forth relative to the layup surface 80.

Some apparatuses 100 are configured to place tapes 52 on a layup surface 80 in more than one direction, including in two or more opposite linear directions, including the first direction 82 and an opposite, second direction 84, schematically and optionally represented in FIG. 6 with the large right arrow. With reference to FIG. 6, in such examples, the first tape 108 may be placed on top of the second tape 112 and so forth with respect to an Nth tape 148 as the frame 104 translates along the layup surface 80 in the second direction 84. In some such examples, the apparatus 100 therefore further may include a second composite structure compactor 164 that is supported by the frame 104 relative to the first tape placement module 114 opposite the second tape placement module 116 and that is configured to compact the first tape 108, the second tape 112, and so forth with respect to an Nth tape 148 as the frame 104 translates along the layup surface 80 in the second direction.

As also schematically and optionally represented in FIG. 6, some apparatuses 100 also may include a controller 166 that is configured to control operation of an apparatus 100. In FIG. 6, the controller 166 is schematically illustrated as within the boundaries of the frame 104, schematically representing that the controller may be coupled to and/or supported by the frame 104. However, it also is within the scope of apparatuses 100 that the controller 166 be remote from the frame 104. In FIG. 6, the controller is schematically illustrated with dashed lines interconnecting various components of apparatuses 100, schematically representing that the controller 166 is operatively coupled to and/or in communication with and programmed to selectively operate one or more of the apparatuses' components. Such coupling and communication may take any suitable form including one or more of electronic control, pneumatic control, hydraulic control, mechanical control, etc.

Additionally, a controller 166 may be and/or include any suitable device or devices that are configured to perform the functions of the controller 166 discussed herein. For example, the controller 166 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

Additionally or alternatively, a controller 166 may include, or be configured to read, computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Controller 166, when present, may be operatively in communication with and programmed to selectively operate one or more of the frame 104, the source 106 of first tape 108, the source 110 of second tape 112, the first tape placement module 114, the second tape placement module 116, the optional first tape combining module 124, the optional first tape compactor module 128, the optional first tape folding module 138, the optional second tape combining module 130, the optional second tape compactor module 134, the optional second tape folding module 139, the optional composite structure compactor 160, the optional second composite structure compactor 164, the optional drive assembly 162, and the components associated with any number of optional Nth sub-assemblies 144 to create a layered tape composite structure 49 having a predefined cross-sectional profile 54.

For example, the controller 166 may be programmed to selectively operate the first tape combining module 124 to receive a specific number of first tapes 108 from two or more supplies 120 of first tape 108 and operatively couple them together prior to receipt by the first tape placement module 114. Similarly, the controller 166 may be programmed to selectively operate the second tape combining module 130 to receive a specific number of second tapes 112 from two or more supplies 122 of second tape 112 and operatively couple them together prior to receipt by the second tape placement module 116, and so forth with respect to Nth sub-assemblies 144.

Additionally, in examples of apparatuses 100 that include a composite structure compactor 160, the controller 166 may be programmed to selectively translate the frame 104 in the first direction 82 and selectively operate the composite structure compactor 160 to compact the first tape 108, the second tape 112, and optionally Nth tape 148 on the layup surface 80 as the frame 104 translates along the layup surface 80 in the first direction 82. Similarly, in examples of apparatuses 100 that include a second composite structure compactor 164, the controller 166 may be programmed to selectively translate the frame 104 in the second direction 84 and selectively operate the second composite structure compactor 164 to compact the first tape 108, the second tape 112, and optionally Nth tape 148 on the layup surface 80 as the frame 104 translates along the layup surface 80 in the second direction 84.

Additionally or alternatively, a controller 166 may be programmed to facilitate one or more methods 500 discussed herein with an apparatus 100.

Apparatuses 100 may be used and/or configured to be used ex situ or in situ. That is, the layup surface 80 may be a surface of a structure 78 for temporarily supporting the layered tape composite structure 49 while it is being created, and with the layered tape composite structure 49 to be removed from the structure 78 for subsequent installation as a component of a greater composite structure 30. Such a configuration may be described as ex situ, because the layered tape composite structure 49 is being created remote and separate from the greater composite structure 30 of which the layered tape composite structure 49 is to become integral.

Alternatively, the layup surface 80 may be defined by a greater composite structure 30 itself, such that the layered tape composite structure 49 is being created in place and integral with the greater composite structure 30, and thus such a configuration may be described as in situ.

Regardless of whether or not an apparatus 100 creates a layered tape composite structure 49 in situ or ex situ, the layup surface 80 may be defined by and/or include one or more of a planar surface and/or one or more of a non-planar surface. In some applications, the layup surface 80 may include and/or be defined by a non-planar contour. In some applications, the layup surface 80 may have a generally triangular cross-sectional profile.

Turning now to FIGS. 7-10, illustrative non-exclusive examples of apparatus 100 and portions thereof are illustrated. Where appropriate, the reference numerals from the schematic illustrations of FIG. 6 are used to designate corresponding parts of the illustrated examples; however, the examples of FIGS. 7-10 are non-exclusive and do not limit apparatuses to the illustrated embodiments of FIGS. 7-10. That is, apparatuses 100 are not limited to the specific embodiments illustrated in FIGS. 7-10, and apparatuses 100 may incorporate any number of the various aspects, configurations, characteristics, properties, etc. of apparatuses 100 that are illustrated in and discussed with reference to the schematic representation of FIG. 6 and/or the embodiments of FIGS. 7-10, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIG. 7-10.

FIG. 7 provides an illustrative, non-exclusive example of a combining module 200, which may be utilized as a first tape combining module 124, a second tape combining module 130, and so forth as an Nth tape combining module 152. Accordingly, a combining module 200 may be incorporated into an apparatus 100 that includes a source of tape having two or more supplies of tape. Combining module 200 includes a body 202 that defines two entrance paths 204, 206 for receipt of two tapes 52 and an exit path 208 for delivery of a combined tape 52 downstream to a placement module. Combining module 200 also includes two rethread rollers 210, 212 supported by the body 202 and a swing arm 214 pivotally supported by the body and that supports a swing roller 216 for pivotal movement about pivot point 217 relative to and between the rethread rollers 210, 212 for selective threading of tape 52 along respective paths 204, 206 to be advanced through the combining module 200. Combining module 200 also includes two shear cutter assemblies 218, 220 for selectively cutting the tapes 52, such as to permit selective starting and stopping of tape 52 through the combining module depending on the desired configuration of a layered tape radius filler 50 being created with an apparatus 100. Combining module 200 also includes a spring-biased compactor assembly 222 for operatively coupling together and compacting the two tapes 52 for downstream delivery to a placement module. Other controlled and non-controlled mechanisms, such as pneumatically activated mechanisms, may be used to bias together the rollers of the illustrated compactor assembly 222.

FIG. 8 provides an illustrative, non-exclusive example of a placement module 300, which may be utilized as a first tape placement module 114, a second tape placement module 116, and so forth as an Nth tape placement module 150. Placement module 300 is an example of a placement module that is configured to be used with an apparatus 100 that is configured to place tapes 52 in more than one direction, including opposite linear directions. Placement module 300 includes a body 302, a swing arm 304 pivotally supported about a pivot point 305 relative to the body 302, and a placement roller 306 supported by the body 302. The swing arm 304 defines an entrance path 308 for receiving a tape 52 or combined tape 52 from an upstream component of an apparatus 100, such as directly from a source of tape or from a combining module or compactor module. The body 302 defines two exit paths 310, 312, which selectively receive tape 52 from the entrance path 308 depending on the pivotal position of the swing arm 304. A swing cylinder 318, a swing actuation cylinder 320, and a fiber path direction activation motor 322 are provided to facilitate the selective swinging of the swing arm 304 and thus the selective path of tape through the exit paths 310, 312 in accordance with a selected translation direction of an apparatus 100. The swinging motion of the swing arm is schematically represented in FIG. 8 at 324. In FIG. 8, the swing arm 304 is illustrated in a left position with the entrance path 308 aligned with exit path 310, corresponding to a configuration in which the placement module 300 is moving to the left and placing tape on a layup surface 80 to the right of the placement module 300, from the perspective of FIG. 8. When the swing arm is selectively pivoted to the right, the entrance path 308 will become aligned with exit path 312, corresponding to a configuration in which the placement module 300 is moving to the right and placing tape on a layup surface 80 to the left of the placement module 300, from the perspective of FIG. 8. Placement module 300 also includes a rethread assembly 314 for selectively threading tape 52 through the entrance path 308, and a shear cutter assembly 316 for selectively cutting tape 52, such as to permit selective starting and stopping of tape 52 through the placement module 300 depending on the desired configuration of a layered tape radius filler 50 being created with an apparatus 100.

Figure 9:
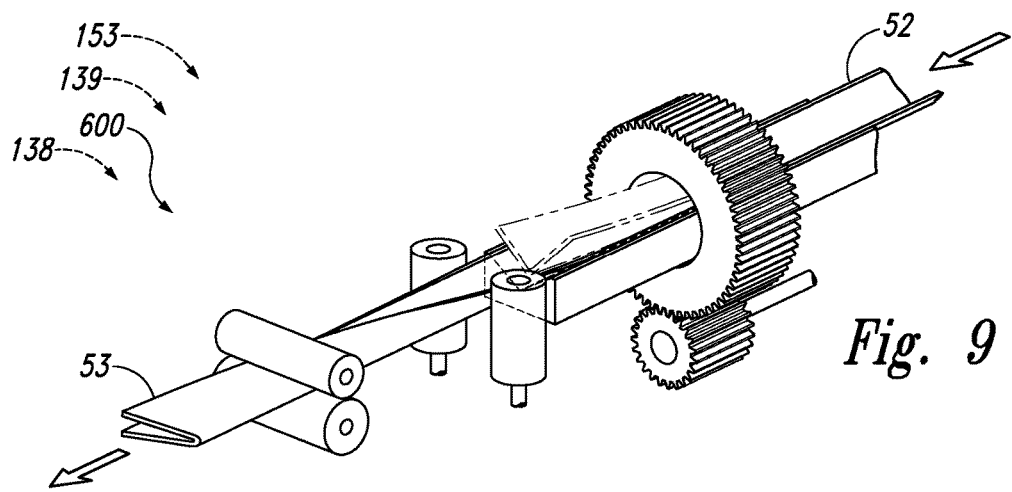
FIG. 9 is a schematic illustration representing an example tape folding module of an apparatus for creating layered tape composite structures.

FIG. 9 provides an illustrative, non-exclusive example of a folding module 600, which may be utilized as a first tape folding module 138, a second tape folding module 139, and so forth as an Nth tape folding module 153. Folding module 600 is an example of a folding module that is configured to fold a tape 52 longitudinally in half to create a folded tape 53 having two layers of equal width.

Figure 10:
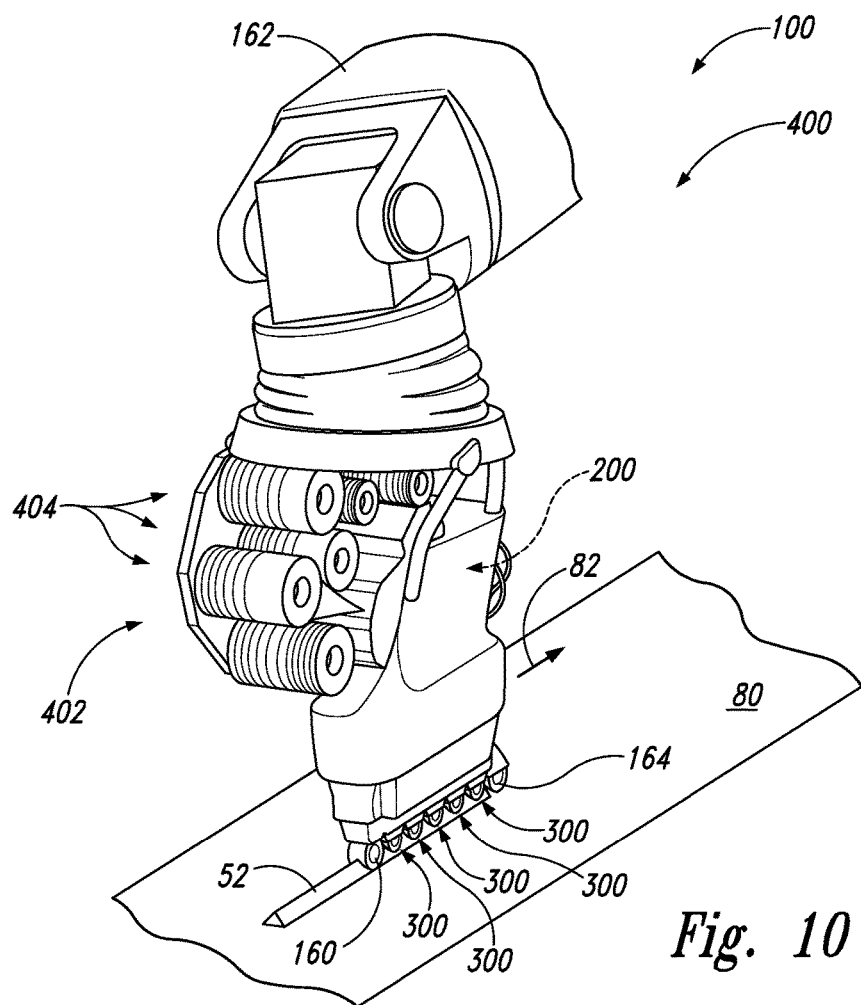
FIG. 10 is a perspective view of an illustrative, non-exclusive example of an apparatus for creating layered tape composite structures, shown in the process of creation of a layered tape composite structure on a layup surface.

Turning now to FIG. 10 an illustrative, non-exclusive example of an apparatus 100 is illustrated and indicated at 400. Apparatus 400 is an example of an apparatus 100 that is operatively coupled to a drive assembly 162 in the form of a robotic arm as an end effector thereof. Moreover, apparatus 400 is an example of an apparatus 100 that is configured to place tape in more than one direction, including opposite linear directions. Accordingly, apparatus 400 includes both a first composite structure compactor 160 for use when the apparatus is being translated in the direction shown, and a second composite structure compactor 164 for use when the apparatus is being translated and a layered tape composite structure 49 is being placed in an opposite direction. Apparatus 400 includes five placement modules 300, corresponding combining modules 200, and a plurality of sources 402 of tape in the form of spools 404 of tape.

Figure 11:
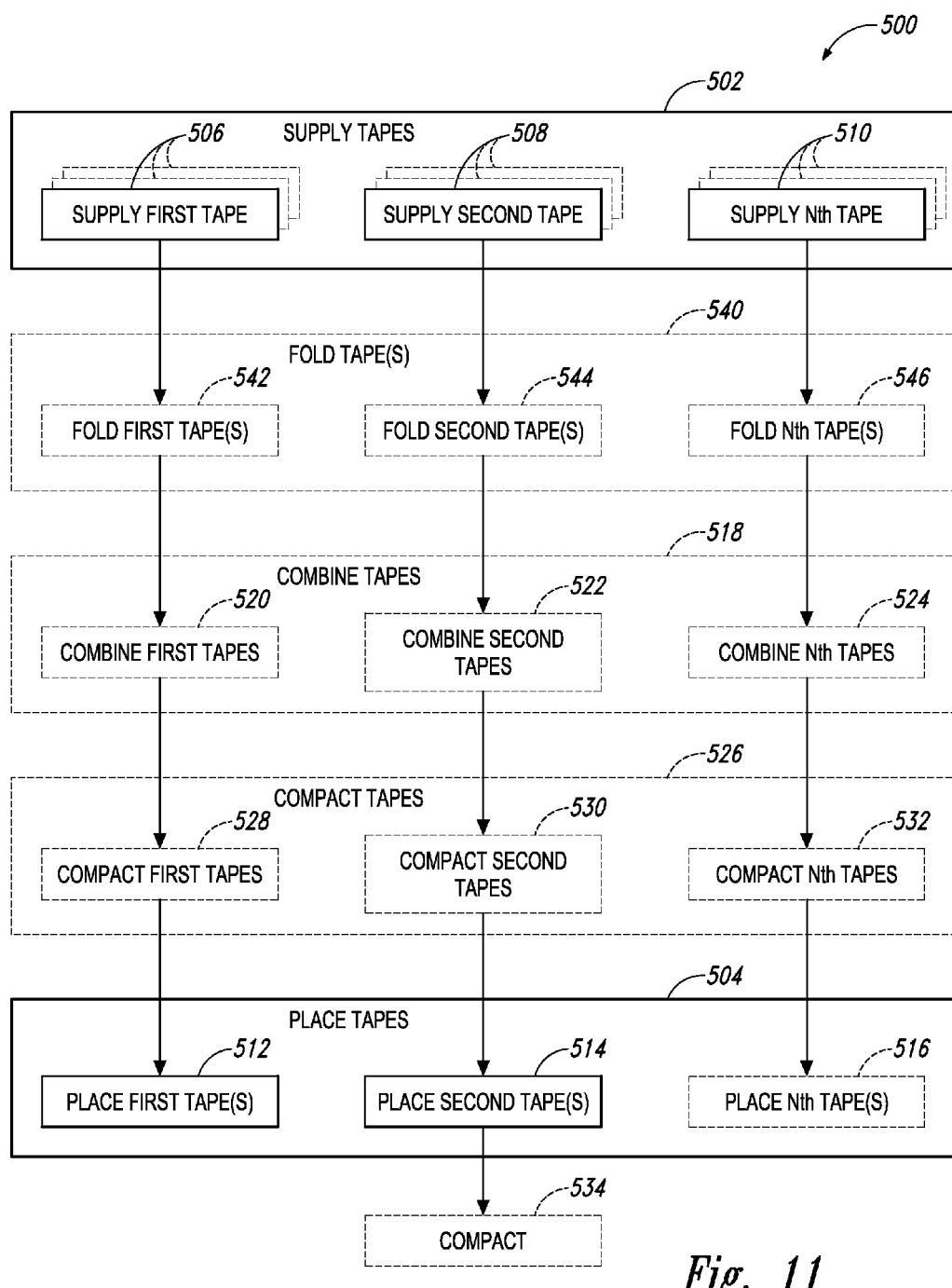
FIG. 11 is a flowchart schematically representing methods for creating layered tape composite structures.

FIG. 11 schematically provides a flowchart that represents illustrative, non-exclusive examples of methods 500 of creating layered tape composite structures. Methods 500 may, but are not required to, be implemented by an apparatus 100 according to the present disclosure. That is, a method 500 may be distinct from an apparatus 100 and may be utilized and/or otherwise implemented in connection with an apparatus that is not expressly disclosed herein.

As illustrated in solid boxes, methods 500 generally include at least supplying tapes at 502 and placing tapes at 504. More specifically, supplying 502 generally includes at least supplying one or more first tapes at 506, and in some optional methods 500 also includes supplying one or more second tapes at 508. In some methods 500 more than two tapes may be supplied, as indicated by the optional supplying one or more Nth tapes at 510. Placing 504 generally includes placing the first tape on a layup surface at 512, and, in methods 500 that include supplying 508, also placing the second tape on the first tape on the layup surface at 514. In methods 500 that include supplying 510, placing 504 also includes placing Nth tapes on the layup mandrel relative to first and second and optionally additional tapes at 516.

In some methods 500, the tapes supplied at 506, 508, and 510 may differ from each other in one or more of width, thickness, fiber material, fiber angle, and binder material. In some methods 500, the tapes are constructed of fiber reinforced composite material.

In methods 500 that include more than one supplying 506, more than one supplying 508, and/or more than one supplying 510, the two or more tapes supplied may include tapes of identical construction, including the same width, the same thickness, the same fiber material, the same fiber angle, and the same binder material. Alternatively, the two or more tapes may include tapes having the same width and optionally the same thickness, but optionally differing in one or more of thickness, fiber material, fiber angle, and binder material.

As schematically and optionally represented in dashed boxes in FIG. 11, some methods 500 further include folding one or more tapes at 540. More specifically, the folding 540 may include one or more of folding at 542 one or more first tapes to form one or more folded first tapes prior to placing the first tape at 512, folding at 544 one or more second tapes to form one or more folded second tapes prior to placing the second tape at 514, and so forth including folding at 546 one or more Nth tapes to form one or more folded Nth tapes prior to placing the Nth tape 516.

As also schematically and optionally represented in dashed boxes in FIG. 11, some methods 500 further include combining tapes at 518. More specifically, the combining 518 may include one or more of combining at 520 the two or more first tapes to form combined first tape prior to the placing the first tape at 512, combining at 522 the two or more second tapes to form combined second tape prior to the placing the second tape at 514, and so forth including combining at 524 two or more Nth tapes to form combined Nth tape prior to the placing the Nth tape at 516.

As also schematically and optionally represented in dashed boxes in FIG. 11, some such methods 500 further include compacting tapes at 526. More specifically, the compacting 526 may include one or more of compacting at 528 the combined first tape and/or the folded first tape following the combining 520 and/or the folding 542 and prior to the placing the first tape at 512, compacting at 530 the combined second tape and/or the folded second tape following the combining 522 and/or the folding 544 and prior to the placing the second tape at 514, and so forth including compacting at 532 the combined Nth tape and/or the folded Nth tape following the combining 524 and/or the folding 546 and prior to the placing the Nth tape at 516.

As also schematically and optionally represented in a dashed box in FIG. 11, some methods 500 also include compacting the first tape, the second tape, and so forth against the layup surface at 534.

Method 500 additionally may include actively controlling one or more of the supplying 506 the first tape, the supplying 508 the second tape, the supplying 510 the Nth tape, the placing 512 the first tape, and the placing 514 the second tape to create a layered tape composite structure having a predefined cross-sectional profile. In some such methods 500, the actively controlling may include one or more of starting and stopping the supplying 506 the first tape to selectively control a thickness of first tape in at least a portion of the layered tape composite structure being created, starting and stopping the supplying 508 the second tape to selectively control a thickness of second tape in at least a portion of the layered tape composite structure being created, and starting and stopping the supplying 510 the Nth tape to selectively control a thickness of Nth tape in at least a portion of the layered tape composite structure being created. Moreover, in methods 500 that include more than one supplying 506, the actively controlling also may include starting and stopping the supplying 506 of at least one the first tapes to selectively control a thickness of first tape in at least a portion of the layered tape composite structure being created. Similarly, in methods 500 that include more than one supplying 508, the actively controlling also may include starting and stopping the supplying 508 of at least one of the second tapes to selectively control a thickness of second tape in at least a portion of the layered tape composite structure being created, and so forth with respect to supplying 510 Nth tape. In methods 500 that include folding 540, the actively controlling also may include starting and stopping one or more of the folding 540, the folding 544, and the folding 546 to selectively control thicknesses of tapes prior to the placing 504.

In some methods 500, the layup surface may be a surface of a structure for temporarily supporting the layered tape composite structure while it is being created. For example the structure defining the layup surface may be or include a table. In such methods 500, the method also may include removing the layered tape composite structure from the layup surface and installing the layered composite structure as a component of a greater composite structure.

In other methods 500, the layup surface may be defined by a greater composite structure being assembled with the layered tape composite structure, such as with the greater composite structure being composed of a fiber reinforced composite material. In some such methods the layup surface may be defined by a non-planar contour, such as having a generally triangular cross-sectional profile.

Figure 12:
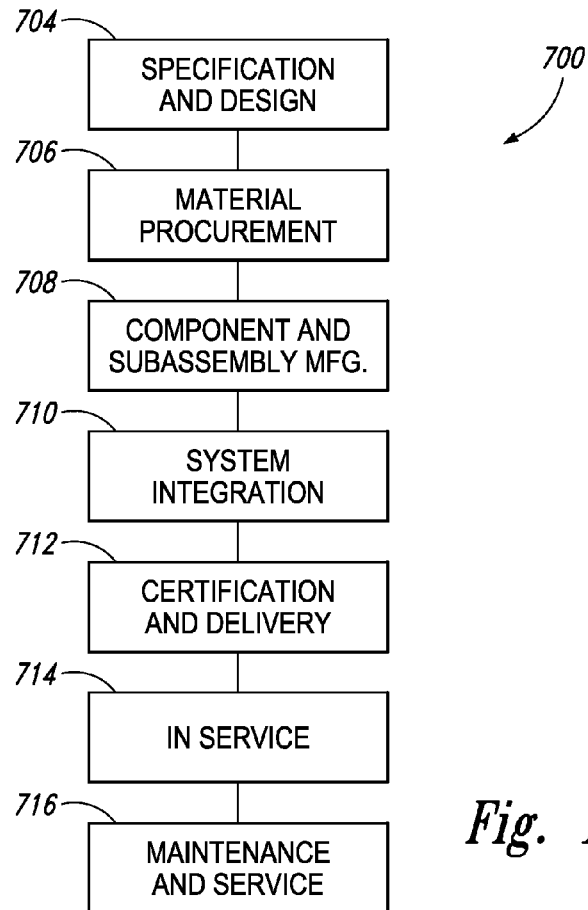
FIG. 12 is a flow diagram of aircraft production and service methodology, which may include apparatuses, structures, and/or methods according to the present disclosure.
Figure 13:
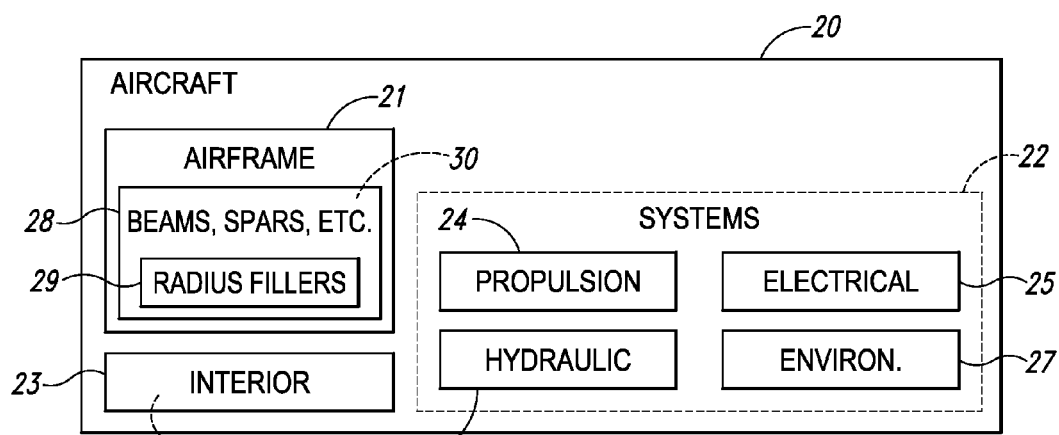
FIG. 13 is a block diagram of an aircraft, which may include layered tape composite structures created by apparatuses and/or methods according to the present disclosure.

Embodiments of the disclosure may be described in the context of an aircraft manufacturing and service method 700 as shown in FIG. 12 and an aircraft 20 as shown in FIG. 13. During pre-production, exemplary method 700 may include specification and design 704 of the aircraft 20 and material procurement 706. During production, component and subassembly manufacturing 708 and system integration 710 of the aircraft 20 takes place, during which steps, inventions according to the present disclosure may be utilized. Thereafter, the aircraft 20 may go through certification and delivery 712 in order to be placed in service 714. While in service by a customer, the aircraft 20 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 20 produced by exemplary method 700 may include an airframe 21 with a plurality of systems 22 and an interior 23. Examples of high-level systems 22 include one or more of a propulsion system 24, an electrical system 25, a hydraulic system 26, and an environmental system 27. Any number of other systems may be included. Although an aerospace example is shown, the principles of the present disclosure may be applied to other industries, such as the automotive industry.

Apparatuses and methods embodied herein may be employed during any one or more of the stages of the production and service method 700. For example, components or subassemblies corresponding to production process 708 may be fabricated or manufactured in a manner similar to components or subassemblies produced while the aircraft 20 is in service. Also, one or more apparatus embodiments, method embodiments, or a combination thereof may be utilized during the production stages 708 and 710, for example, by substantially expediting assembly of or reducing the cost of an aircraft 20. Similarly, one or more of apparatus embodiments, method embodiments, or a combination thereof may be utilized while the aircraft 20 is in service, for example and without limitation, to maintenance and service 716 of aircraft 20.

As schematically represented in FIG. 13, airframe 21 may include structural components 28, such as beams, spars, and various other assemblies, which assemblies may include radius fillers, or noodles, 29. Moreover, as also schematically represented in FIG. 13 various structural components 28 of airframe 21, as well as various components of interior 23, may include, or be constructed at least in part of, composite structures 30.

Illustrative, non-exclusive examples of inventive subject matter according to the present disclosure are described in the following enumerated paragraphs:

A. An apparatus for creating a layered tape composite structure, the apparatus comprising:
a frame configured to be translated relative to a layup surface;
a source of first tape supported by the frame; and
a first tape placement module supported by the frame and configured to receive first tape from the source of first tape and place the first tape on the layup surface as the frame translates along the layup surface in a first direction.

A1. The apparatus of paragraph A. further comprising:
a source of second tape supported by the frame; and
a second tape placement module supported by the frame relative to the first tape placement module and configured to receive second tape from the source of second tape and place the second tape on the first tape placed on the layup surface as the frame moves along the layup surface in the first direction.

A1.1. The apparatus of paragraph A1, wherein the first tape differs from the second tape in one or more of width, thickness, and material construction, optionally wherein the first tape and the second tape are constructed of fiber reinforced composite material, optionally wherein the first tape differs from the second tape in one or more of fiber material, fiber angle, and binder material.

A2. The apparatus of any of paragraphs A-A1.1, wherein the source of first tape includes two or more supplies of first tape.

A2.1. The apparatus of paragraph A2, wherein the two or more supplies of first tape include tapes of identical construction, including the same width, the same thickness, the same fiber material, the same fiber angle, and the same binder material.

A2.2. The apparatus of paragraph A2, wherein the two or more supplies of first tape include tapes having the same width, optionally the same thickness, and optionally differing in one or more of thickness, fiber material, fiber angle, and binder material.

A2.3 The apparatus of any of paragraphs A2-A2.2, further comprising:
a first tape combining module supported by the frame and configured to receive first tapes from the two or more supplies of first tape and to operatively couple the first tapes together to form combined first tape prior to receipt by the first tape placement module.

A2.3.1. The apparatus of paragraph A2.3, wherein the first tape combining module is further configured to compact the combined first tape prior to receipt by the first tape placement module.

A2.3.2. The apparatus of paragraph A2.3, further comprising:
a first tape compactor module supported by the frame and configured to receive the combined first tape from the first tape combining module and to compact the combined first tape prior to receipt by the first tape placement module.

A3. The apparatus of any of paragraphs A1-A2.3.2 when depending from paragraph A1, wherein the source of second tape includes two or more supplies of second tape.

A3.1. The apparatus of paragraph A3, wherein the two or more supplies of second tape include tapes of identical construction, including the same width, the same thickness, the same fiber material, the same fiber angle, and the same binder material.

A3.2. The apparatus of paragraph A3, wherein the two or more supplies of second tape include tapes having the same width, optionally the same thickness, and optionally differing in one or more of thickness, fiber material, fiber angle, and binder material.

A3.3 The apparatus of any of paragraphs A3-A3.2, further comprising:
a second tape combining module supported by the frame and configured to receive second tapes from the two or more supplies of second tape and to operatively couple the second tapes together to form combined second tape prior to receipt by the second tape placement module.

A3.3.1. The apparatus of paragraph A3.3, wherein the second tape combining module is further configured to compact the combined second tape prior to receipt by the second tape placement module.

A3.3.2. The apparatus of paragraph A3.3, further comprising:
a second tape compactor module supported by the frame and configured to receive the combined second tape from the second tape combining module and to compact the combined second tape prior to receipt by the second tape placement module.

A4. The apparatus of any of paragraphs A-A3.3.2, further comprising:
a first tape folding module supported by the frame and configured to receive first tape from the source of first tape and to operatively fold the first tape longitudinally against itself to form a folded first tape prior to receipt by the first tape placement module.

A5. The apparatus of any of paragraphs A-A4 when depending from paragraph A1, further comprising:
a second tape folding module supported by the frame and configured to receive second tape from the source of second tape and to operatively fold the second tape longitudinally against itself to form a folded second tape prior to receipt by the second tape placement module.

A6. The apparatus of any of paragraphs A-A5, further comprising:
a composite structure compactor supported by the frame relative to the second tape placement module opposite the first tape placement module and configured to compact the first tape (and when depending from paragraph A1 the second tape) on the layup surface as the frame translates along the layup surface in the first direction.

A7. The apparatus of any of paragraphs A1-A6 when depending from paragraph A1,
wherein the second tape placement module is further configured to selectively place the second tape on the layup surface as the frame translates along the layup surface in a second direction that is opposite the first direction; and
wherein the first tape placement module is further configured to selectively place the first tape on the second tape placed on the layup surface as the frame translates along the layup surface in the second direction.

A7.1. The apparatus of paragraph A7 when depending from paragraph A6, wherein the composite structure compactor is a first composite structure compactor, the apparatus further comprising:

a second composite structure compactor supported by the frame relative to the first tape placement module opposite the second tape placement module and configured to compact the first tape and the second tape on the layup surface as the frame translates along the layup surface in the second direction.

A8. The apparatus of any of paragraphs A-A7.1, further comprising:
a drive assembly operatively coupled to the frame and configured to operatively and selectively translate the frame relative to the layup surface.

A8.1. The apparatus of paragraph A8, wherein the drive assembly includes a robotic arm.

A9. The apparatus of any of paragraphs A-A8.1, further comprising:
a controller operatively in communication with and programmed to selectively operate one or more of the frame, the source of first tape, a/the source of second tape, the first tape placement module, and a/the second tape placement module, and optionally one or more of a/the first tape combining module, a/the first tape compactor, a/the second tape combining module, a/the second tape compactor, a/the composite structure compactor, a/the second composite structure compactor, and a/the drive assembly to create a layered tape composite structure having a predefined cross-sectional profile.

A9.1. The apparatus of paragraph A9 when depending from paragraph A2.3, wherein the controller is programmed to selectively operate the first tape combining module to receive a specific number of first tapes from the two or more supplies of first tape and operatively couple them together prior to receipt by the first tape placement module.

A9.2. The apparatus of any of paragraphs A9-A9.1 when depending from paragraph A3.3, wherein the controller is programmed to selectively operate the second tape combining module to receive a specific number of second tapes from the two or more supplies of second tape and operatively couple them together prior to receipt by the second tape placement module.

A9.3. The apparatus of any of paragraphs A9-A9.2 when depending from paragraph A4, wherein the controller is programmed to selectively operate the first tape folding module to receive first tape from the supply of first tape and operatively fold the first tape against itself prior to receipt by the first tape placement module.

A9.4. The apparatus of any of paragraphs A9-A9.3 when depending from paragraph A5, wherein the controller is programmed to selectively operate the second tape folding module to receive second tape from the supply of second tape and operatively fold the second tape against itself prior to receipt by the second tape placement module.

A9.5. The apparatus of any of paragraphs A-A9.4 when depending from paragraph A6, wherein the controller is programmed to selectively translate the frame in the first direction and selectively operate the composite structure compactor to compact the first tape and the second tape on the layup surface as the frame translates along the layup surface in the first direction.

A9.6. The apparatus of any of paragraphs A-A9.5 when depending from paragraph A6.1, wherein the controller is programmed to selectively translate the frame in the second direction and selectively operate the second composite structure compactor to compact the first tape and the second tape on the layup surface as the frame translates along the layup surface in the second direction.

A10. The apparatus of any of paragraphs A1-A9.6 when depending from paragraph A1, further comprising:
one or more additional sources of tape supported by the frame; and
one or more additional placement modules supported by the frame relative to the first tape placement module and the second tape placement module and respectively corresponding to the one or more additional sources of tape;
optionally one or more additional tape combining modules supported by the frame and respectively corresponding to the one or more additional sources of tape;
optionally one or more additional compactor modules supported by the frame and respectively corresponding to the one or more additional sources of tape;
optionally one or more additional tape folding modules supported by the frame and respectively corresponding to the one or more additional sources of tapes; and
optionally when depending from paragraph A8, wherein the controller is operatively in communication with and programmed to operate one or more of the one or more additional sources of tape, the one or more additional placement modules, the one or more additional tape combining modules, the one or more additional compactor modules, and the one or more additional tape folding modules.

A11. The apparatus of any of paragraphs A-A10, further comprising the layup surface positioned relative to the frame for receipt of the first tape.

A11.1. The apparatus of paragraph A11, wherein the layup surface is a surface of a structure for temporarily supporting the layered tape composite structure while it is being created, the layered tape composite structure to be removed from the structure for subsequent installation as a component of a greater composite structure.

A11.2. The apparatus of paragraph A11, wherein the layup surface is defined by a composite greater structure being assembled with the layered tape composite structure.

A11.2.1. The apparatus of paragraph A11.2, wherein the greater composite structure is composed of a fiber reinforced composite material.

A11.3. The apparatus of any of paragraphs A11-A11.2.1, wherein the layup surface is defined by a non-planar contour, optionally having a generally triangular cross-sectional profile.

A12. The apparatus of any of paragraphs A-A11.3, wherein the layered tape composite structure is a layered tape radius filler.

A13. The apparatus of any of paragraphs A-A12, wherein the apparatus is configured to facilitate the method of any of paragraphs B-B11.

A14. The use of the apparatus of any of paragraphs A-A13 to create a layered tape composite structure, optionally a layered tape radius filler.

B. A method of creating a layered tape composite structure, the method comprising:
supplying a first tape; and
placing the first tape on a layup surface.

B1. The method of paragraph B, further comprising:
supplying a second tape; and
placing the second tape on the first tape on the layup surface.

B1.1. The method of paragraph B1, wherein the first tape differs from the second tape in one or more of width, thickness, and material construction, optionally wherein the first tape and the second tape are constructed of fiber reinforced composite material, optionally wherein the first tape differs from the second tape in one or more of fiber material, fiber angle, and binder material.

B2. The method of any of paragraphs B-B1, wherein the supplying the first tape includes supplying two or more first tapes.

B2.1. The method of paragraph B2, wherein the two or more first tapes include tapes of identical construction, including the same width, the same thickness, the same fiber material, the same fiber angle, and the same binder material.

B2.2. The method of paragraph B2, wherein the two or more first tapes include tapes having the same width, optionally the same thickness, and optionally differing in one or more of thickness, fiber material, fiber angle, and binder material.

B2.3 The method of any of paragraphs B2-B2.2, further comprising:

combining the two or more first tapes to form combined first tape prior to the placing the first tape.

B2.3.1. The method of paragraph B2.3, further comprising:

compacting the combined first tape prior to the placing the first tape.

B3. The method of any of paragraphs B1-B2.3.1 when depending from paragraph B1, wherein the supplying the second tape includes supplying two or more second tapes.

B3.1. The method of paragraph B3, wherein the two or more second tapes include tapes of identical construction, including the same width, the same thickness, the same fiber material, the same fiber angle, and the same binder material.

B3.2. The method of paragraph B3, wherein the two or more second tapes include tapes having the same width, optionally the same thickness, and optionally differing in one or more of thickness, fiber material, fiber angle, and binder material.

B3.3 The method of any of paragraphs B3-B3.2, further comprising:

combining the two or more second tapes to form combined second tape prior to the placing the second tape.

B3.3.1. The method of paragraph B3.3, further comprising:

compacting the combined second tape prior to the placing the second tape.

B4. The method of any of paragraphs B-B3.3.1, further comprising:

longitudinally folding the first tape prior to the placing the first tape.

B5. The method of any of paragraphs B1-B4 when depending from paragraph B1, further comprising:

longitudinally folding the second tape prior to the placing the second tape.

B6. The method of any of paragraphs B-B5, further comprising:

compacting the first tape (and when depending from paragraph B1 the second tape) against the layup surface.

B7. The method of any of paragraphs B-B6, further comprising:

actively controlling one or more of the supplying the first tape, a/the supplying the second tape, the placing the first tape, and a/the placing the second tape to create a layered tape composite structure having a predefined cross-sectional profile.

B7.1. The method of paragraph B7, wherein the actively controlling includes one or more of:

starting and stopping the supplying the first tape to selectively control a thickness of first tape in at least a portion of the layered tape composite structure being created;

when depending from paragraph B1, starting and stopping the supplying the second tape to selectively control a thickness of second tape in at least a portion of the layered tape composite structure being created;

when depending from paragraph B2, starting and stopping the supplying of at least one the first tapes to selectively control a thickness of first tape in at least a portion of the layered tape composite structure being created;

when depending from paragraph B3, starting and stopping the supplying of at least one of the second tapes to selectively control a thickness of second tape in at least a portion of the layered tape composite structure being created;

when depending from paragraph B4, starting and stopping the longitudinally folding the first tape to selectively control a thickness and a width of first tape in at least a portion of the layered tape composite structure being created; and when depending from paragraph B5, starting and stopping the longitudinally folding the second tape to selectively control a thickness and a width of second tape in at least a portion of the layered tape composite structure being created.

B8. The method of any of paragraphs B1-B7.1 when depending from paragraph B1, further comprising:

supplying one or more additional sources of tape; and placing tape from the one or more additional sources of tape relative to the first tape and the second tape on the layup surface;

optionally when depending from paragraph B7, wherein the actively controlling further includes actively controlling one or more of the supplying one or more additional sources of tape, actively controlling the placing tape from the one or more additional sources of tape, starting and stopping the supplying one or more additional sources of tapes, and starting and stopping the placing tape from the one or more additional sources of tape.

B9. The method of any of paragraphs B-B8, wherein the layup surface is a surface of a structure for temporarily supporting the layered tape composite structure while it is being created, the method further comprising:

removing the layered tape composite structure from the layup surface and installing the layered tape composite structure as a component of a greater composite structure.

B10. The method of any of paragraphs B-B8, wherein the layup surface is defined by a greater composite structure being assembled with the layered tape composite structure, optionally wherein the greater composite structure is composed of a fiber reinforced composite material, and optionally wherein the layup surface is defined by a non-planar contour, optionally having a generally triangular cross-sectional profile.

B11. The method of any of paragraphs B-B10, wherein the layered tape composite structure is a layered tape radius filler.

B12. The method of any of paragraphs B-B11, wherein the method is performed by the apparatus of any of paragraphs A-A13.

B13. A layered tape composite structure created according to the method of any of paragraphs B-B12.

C. A method of creating a layered tape composite structure, the method comprising:

supplying one or more first tapes;

supplying one or more second tapes;

placing the one or more first tapes on a layup surface;

placing the one or more second tape on the one or more first tapes on the layup surface; and actively controlling one of (i) a number of first tapes being supplied and placed to control a thickness of the first tapes being placed, and (ii) a number of second tapes being supplied and placed to control a thickness of the second tapes being placed;

wherein the first tape differs from the second tape in one or more of width, thickness, and material construction.

C1. The method of paragraph C, wherein the layered tape composite structure is a layered tape radius filler.

C2. The method of any of paragraphs C-C1, wherein the method is performed by the apparatus of any of paragraphs A-A13.

C3. The method of any of paragraphs C-C2, further comprising the subject matter of any of paragraphs B-B12.

C4. A layered tape composite structure created according to the method of any of paragraphs C-C3.

D. A method of creating a layered tape composite structure, the method comprising:

supplying two or more tapes, wherein the two or more tapes have the same width;

combining the two or more tapes to form a combined tape; and placing the combined tape on a layup surface.

D1. The method of paragraph D, wherein the layered tape composite structure is a layered tape radius filler.

D2. The method of any of paragraphs D-D1, wherein the method is performed by the apparatus of any of paragraphs A-A13.

D3. The method of any of paragraphs D-D2, further comprising the subject matter of any of paragraphs B-B12.

E. A method of creating a layered tape composite structure, the method comprising:

supplying one or more first tapes;

supplying one or more second tapes, wherein the first tapes differ from the second tapes in at least one of width and thickness;

one of:
 combining two or more of the one or more first tapes to form combined first tape; and
 combining two or more of the one or more second tapes to form combined second tape;

placing the one or more first tapes on a layup surface; and placing the one or more second tapes on the one or more first tapes on the layup surface.

E1. The method of paragraph E, wherein the first tapes differ from the second tapes in width.

E2. The method of any of paragraphs E-E1, further comprising:

actively controlling one or more of the supplying one or more first tapes, the supplying one or more second tapes, the placing the one or more first tapes, and the placing the one or more second tapes to create a layered tape radius filler having a predefined cross-sectional profile.

E3. The method of paragraph E2, wherein the actively controlling includes one or more of:

starting and stopping the supplying one or more first tapes to selectively control a thickness of first tape in at least a portion of the layered tape composite structure being created; and starting and stopping the supplying one or more second tapes to selectively control a thickness of second tape in at least a portion of the layered tape composite structure being created.

E4. The method of any of paragraphs E-E3, wherein the first tape differs from the second tape in one or more of thickness and material construction.

E5. The method of any of paragraphs E-E4, wherein the supplying the first tape includes supplying two or more first tapes, the method including combining two or more of the two or more first tapes to form combined first tape.

E6. The method of paragraph E5, wherein the first tape is constructed of fiber reinforced composite material, and wherein the two or more first tapes include tapes of identical construction, including the same width, the same thickness, the same fiber material, the same fiber angle, and the same binder material.

E7. The method of paragraph E6, wherein the first tape is constructed of fiber reinforced composite material, and wherein the two or more first tapes include tapes having the same width and differing in one or more of thickness, fiber material, fiber angle, and binder material.

E8. The method of any of paragraphs E5-E7, further comprising:

compacting the combined first tape prior to the placing the first tape.

E9. The method of any of paragraphs E-E8, wherein the supplying the second tape includes supplying two or more second tapes, the method including combining two or more of the two or more second tapes to form combined second tape.

E10. The method of paragraph E9, wherein the second tape is constructed of fiber reinforced composite material, and wherein the two or more second tapes include tapes of identical construction, including the same width, the same thickness, the same fiber material, the same fiber angle, and the same binder material.

E11. The method of paragraph E9, wherein the second tape is constructed of fiber reinforced composite material, and wherein the two or more second tapes include tapes having the same width and differing in one or more of thickness, fiber material, fiber angle, and binder material.

E12. The method of any of paragraphs E9-E11, further comprising:

compacting the combined second tape prior to the placing the second tape.

E13. The method of any of paragraphs E-E12, further comprising:

longitudinally folding the first tape prior to the placing the first tape.

E14. The method of any of paragraphs E-E13, further comprising:

longitudinally folding the second tape prior to the placing the second tape.

E15. The method of any of paragraphs E-E14, further comprising:

compacting the first tape and the second tape against the layup surface.

E16. The method of any of paragraphs E-E15, wherein the layup surface is a surface of a structure for temporarily supporting the layered tape composite structure while it is being created, the method further comprising:

removing the layered tape composite structure from the layup surface and installing the layered tape composite structure as a component of a greater composite structure.

E17. The method of any of paragraphs E-E16, wherein the layup surface is defined by a greater composite structure being assembled with the layered tape composite structure.

E18. The method of any of paragraphs E-E17, wherein the layered tape composite structure is a layered tape radius filler.

E19. The method of any of paragraphs E-E18, wherein the method is performed by the apparatus of any of paragraphs A-A13.

E20. The method of any of paragraphs E-E19, further comprising the subject matter of any of paragraphs B-B12.

E21. A layered tape composite structure created according to the method of any of paragraphs E-E20.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of creating a layered tape composite structure using an end effector that comprises a frame configured to be translated relative to a layup surface, two or more supplies of first tape supported by the frame, a first tape combining module supported by the frame, a first tape placement module supported by the frame, two or more supplies of second tape supported by the frame, a second tape combining module supported by the frame, and a second tape placement module supported by the frame, the method comprising:

supplying, by at least one of the two or more supplies of first tape, one or more first tapes, wherein the first tapes all have the same first width;

supplying, by at least one of the two or more supplies of second tape, one or more second tapes, wherein the second tapes all have the same second width, and wherein the second width is different from the first width;

at least of:

receiving, by the first tape combining module from the two or more supplies of first tape, two or more of the one or more first tapes and combining, by the first tape combining module, the two or more of the one or more first tapes to form combined first tape; and receiving, by the second tape combining module from the two or more supplies of second tape, two or more of the one or more second tapes and combining, by the second tape combining module, the two or more of the one or more second tapes to form combined second tape;

receiving, by the first tape placement module from the first tape combining module, the one or more first tapes and placing, by the first tape placement module, the one or more first tapes on the layup surface;

receiving, by the second tape placement module from the second tape combining module, the one or more second tapes and placing, by the second tape placement module, the one or more second tapes on the one or more first tapes on the layup surface; and actively controlling one or more of the first tape combining module, the second tape combining module, the first tape placement module, and the second tape placement module to actively control a cross-sectional profile of the layered tape composite structure along a length of the layered tape composite structure as the layered tape composite structure is being created by the end effector.

2. The method of claim 1, wherein the actively controlling includes one or more of:

starting and stopping the supplying the one or more first tapes to actively control a thickness of first tape in at least a portion of the layered tape composite structure being created; and starting and stopping the supplying the one or more second tapes to actively control a thickness of second tape in at least a portion of the layered tape composite structure being created.

3. The method of claim 1, wherein the first tape differs from the second tape in one or more of thickness and material construction.

4. The method of claim 1, wherein the supplying the first tape includes supplying two or more first tapes, the method including receiving, by the first tape combining module from the two or more supplies of first tape, two or more of the one or more first tapes and combining, by the first tape combining module, the two or more of the two or more first tapes to form combined first tape.

5. The method of claim 4, wherein the first tape is constructed of fiber reinforced composite material, and wherein the two or more first tapes include tapes of identical construction, including the same width, the same thickness, the same fiber material, the same fiber angle, and the same binder material.

6. The method of claim 4, wherein the first tape is constructed of fiber reinforced composite material, and wherein the two or more first tapes include tapes differing in one or more of thickness, fiber material, fiber angle, and binder material.

7. The method of claim 4, wherein the end effector further comprises a first tape compactor module supported by the frame, the method further comprising:

receiving, by the first tape compactor module from the first tape combining module, the combined first tape and compacting, by the first tape compactor module, the combined first tape prior to the placing the combined first tape.

8. The method of claim 1, wherein the supplying the second tape includes supplying two or more second tapes, the method including receiving, by the second tape combining module from the two or more supplies of second tape, two or more of the one or more second tapes and combining, by the second tape combining module, the two or more of the two or more second tapes to form combined second tape.

9. The method of claim 8, wherein the second tape is constructed of fiber reinforced composite material, and wherein the two or more second tapes include tapes of identical construction, including the same width, the same thickness, the same fiber material, the same fiber angle, and the same binder material.

10. The method of claim 8, wherein the second tape is constructed of fiber reinforced composite material, and wherein the two or more second tapes include tapes differing in one or more of thickness, fiber material, fiber angle, and binder material.

11. The method of claim 8, wherein the end effector further comprises a second tape compactor module supported by the frame, the method further comprising:
receiving, by the second tape compactor module from the second tape combining module, the combined second tape and compacting, by the second tape compactor module, the combined second tape prior to the placing the combined second tape.

12. The method of claim 1, wherein the end effector further comprises a first tape folding module supported by the frame, the method further comprising:
receiving, by the first tape folding module from one of the supplies of first tape, the first tape and longitudinally folding, by the first tape folding module, the first tape prior to the placing the first tape.

13. The method of claim 1, wherein the end effector further comprises a second tape folding module supported by the frame, the method further comprising:
receiving, by the second tape folding module from one of the supplies of second tape, the second tape and longitudinally folding, by the second tape folding module, the second tape prior to the placing the second tape.

14. The method of claim 1, wherein the end effector further comprises a composite structure compactor supported by the frame, the method further comprising:
compacting, by the composite structure compactor, the first tape and the second tape against the layup surface.

15. The method of claim 1, wherein the layup surface is a surface of a structure for temporarily supporting the layered tape composite structure while it is being created, the method further comprising:
removing the layered tape composite structure from the layup surface and installing the layered tape composite structure as a component of a greater composite structure.

16. The method of claim 1, wherein the placing the one or more first tapes and the placing the one or more second tapes comprises placing in situ the one or more first tapes and the one or more second tapes on a greater composite structure being assembled with the layered tape composite structure.

17. The method of claim 1, wherein the layered tape composite structure is a layered tape radius filler.

18. A layered tape composite structure created according to the method of claim 1.

19. A method of creating a layered tape composite structure using an end effector that comprises a frame configured to be translated relative to a layup surface, two or more supplies of first tape supported by the frame, two or more supplies of second tape supported by the frame, a first tape placement module supported by the frame, and a second tape placement module supported by the frame, the method comprising:
supplying, by at least one of the two or more supplies of first tape, one or more first tapes, wherein the first tapes all have the same first width;
supplying, by at least one of the two or more supplies of second tape, one or more second tapes, wherein the second tapes all have the same second width, and wherein the second width is different from the first width;
receiving, by the first tape placement module from the two or more supplies of first tape, the one or more first tapes and placing, by the first tape placement module, the one or more first tapes on the layup surface;
receiving, by the second tape placement module from the two or more supplies of second tape, the one or more second tapes and placing, by the second tape placement module, the one or more second tapes on the one or more first tapes on the layup surface; and
actively controlling at least one of (i) a number of first tapes being supplied and placed by the first tape placement module to actively control a thickness of the first tapes within the layered tape composite structure, and (ii) a number of second tapes being supplied and placed by the second tape placement module to actively control a thickness of the second tapes within the layered tape composite structure as the layered tape composite structure is being created by the end effector.

20. A layered tape composite structure created according to the method of claim 19.

21. The method of claim 1,
wherein the placing the one or more first tapes on the layup surface comprises placing the one or more first tapes on the layup surface by translating the end effector in a first direction; and
wherein the placing the one or more second tapes on the layup surface is performed simultaneously with the placing the one or more first tapes and comprises placing the one or more second tapes on the layup surface by translating the end effector in the first direction.

22. The method of claim 1,
wherein the placing the one or more first tapes on the layup surface comprises placing the one or more first tapes on the layup surface by translating the end effector in a first direction; and
wherein the placing the one or more second tapes on the layup surface is performed subsequent to the placing the one or more first tapes and comprises placing the one or more second tapes on the layup surface by translating the end effector in a second direction opposite the first direction.

23. The method of claim 19,
wherein the placing the one or more first tapes on the layup surface comprises placing the one or more first tapes on the layup surface by translating the end effector in a first direction; and
wherein the placing the one or more second tapes on the layup surface is performed simultaneously with the placing the one or more first tapes and comprises placing the one or more second tapes on the layup surface by translating the end effector in the first direction.

24. The method of claim 19,
wherein the placing the one or more first tapes on the layup surface comprises placing the one or more first tapes on the layup surface by translating the end effector in a first direction; and
wherein the placing the one or more second tapes on the layup surface is performed subsequent to the placing the one or more first tapes and comprises placing the one or more second tapes on the layup surface by translating the end effector in a second direction opposite the first direction.

* * * * *